United States Patent Office 3,115,487
Patented Dec. 24, 1963

3,115,487
POLYMERIZATION OF UNSATURATED ORGANIC COMPOUNDS IN AQUEOUS DISPERSION
Hans Bauer, Eduard Bergmeister, and Joseph Heckmaier, all of Burghausen, Upper Bavaria, Germany, assignors to Wacker-Chemie G.m.b.H., Munich, Germany, a firm of Germany
No Drawing. Filed June 17, 1959, Ser. No. 820,870
Claims priority, application Germany July 16, 1958
7 Claims. (Cl. 260—92.8)

In the processing of vinyl polymers, especially polyvinyl chloride, it has frequently been observed that when these polymers are subjected to the action of heat it is quite difficult and frequently almost impossible to produce articles which are either clear and colorless or are tinted in delicate pastel shades. This is especially true of those polymers that contain certain compounds of lead as stabilizers.

It is, therefore, an important object of this invention to provide a process for the production of vinyl polymers which are highly resistant to discoloration under the influence of the heat normally employed in processing these polymeric materials.

Another object of this invention is the provision of a process for the polymerization of monomeric, polymerizable unsaturated organic compounds in an aqueous medium which contains a dispersing agent which acts to impart ultimate color stability to the polymers obtained.

Other objects of this invention will appear from the following detailed description.

It has now been found, and quite surprisingly, that polymers of monomeric unsaturated organic compounds which exhibit a very markedly improved degree of color stability can now be obtained if the unsaturated organic compounds are polymerized in an aqueous medium to which a dispersing agent comprising a polyvinyl phosphate or a salt thereof has been added.

The particular polyvinyl phosphates which are preferably employed in accordance with the novel process of this invention are those which are more fully described, for example, in U.S. Patent No. 2,609,360 and also in "Industrial and Engineering Chemistry," vol. 46, No. 5, May 1954, pages 1042–1045. The methods for the preparation of these compounds may also be found therein. The polyvinyl alcohol may be phosphorylated by reaction with phosphorus oxychloride, with phosphorus pentoxide, with ortho-phosphoric acid and with a mixture of phosphoric acid and urea. The latter method yields a polyvinyl phosphate which has a desirable degree of water solubility. The methods are more fully described in the publication referred to and in the patent mentioned above.

The salts of polyvinyl phosphate which are particularly advantageous for use in the process of this invention are the alkali metal salts such as the sodium and potassium salts as well as the ammonium salts, and especially the monoammonium salt of polyvinyl phosphate. The preferred monoammonium salt of polyvinyl phosphate has the following structure and is composed of recurring units of the following formula in which the phosphorus is singly bound:

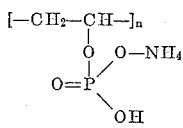

The preferred salt is that which contains about two to three phosphoric acid groups per four vinyl groups. The theoretical phosphorus for this compound is up to 19.9% and the nitrogen up to 9.0%.

In addition, those phosphates are also suitable which are obtained from partially as well as completely saponified polyvinyl acetates. Both the acetate and the phosphate ratio may be varied in this way with the result that the solubility in water may be altered to the desired degree. In place of phosphorylated polyvinyl alcohol or phosphorylated partially acetylated polyvinyl alcohol, there can also be employed the phosphorylated copolymers of vinyl alcohol with higher vinyl esters, acrylic acid, methacrylic acid, maleic acid derivatives, and the like.

The dispersing agents employed in the process of the present invention may be employed during the polymerization of any polymerizable unsaturated organic compound capable of undergoing polymerization under the action of heat or light or with the aid of a water-soluble or an oil-soluble catalyst, or under the action of any combination of these aids to polymerization. While the process of the present invention is particularly valuable in connection with the polymerization of vinyl chloride and the production of polyvinyl chloride having greatly improved color stability, the novel process described is equally valuable in connection with the production of homopolymers and copolymers of improved color stability from other polymerizable monomers such as vinyl bromide, vinylidene chloride, styrene, paramethylstyrene, vinyl acetate, vinyl butyrate, acrylic acid esters, butadiene, etc.

Other agents which are commonly employed in aiding the polymerization reaction may also be employed in the process of this invention. Thus, for example, the aqueous polymerization reaction medium may also contain ionic as well as non-ionic wetting agents with or without added neutral, acid and basic salts as well as organic and inorganic acids. Examples of said agents are: ionic surface-active agents, such as dodecylbenzene sodium sulfonate, sodium tetradecyl sulfate, sodium pentadecyl sulfate, sodium octyl sulfate, sodium salt of aryl alkyl polyether sulfonate, crude sodium oleate (saponified red oil), sodium laurate, sodium caprate, sodium caprylate, sodium caproate, potassium stearate, calcium oleate (precipitated in situ from sodium oleate and $CaCl_2$); non-ionic wetting agents, such as sorbitan monolaurate, polyethylene glycol ether of dodecylphenol, pentaerythritol monooleate; neutral salts, such as $CaCl_2$; acid salts, such as $FeCl_3$; basic salts, such as $Na_2CO_3$; organic acids, such as oleic acid; and inorganic acids, such as boric acid.

In order further to illustrate this invention the following example is given:

*Example*

A mixture of 150 kilos of water, 11 grams of sodium bicarbonate, 122 grams of polyvinyl monoammonium phosphate having a phosphorus content of 16.5% and 75 grams of dilauroylperoxide are charged into a stirring autoclave. After very careful removal of all of the oxygen from the open space in the autoclave above the reaction mixture it is then charged with 75 kilos of vinyl chloride and polymerization is effected at a temperature of 54° C. until a marked drop in pressure is observed. When the polymer obtained is then compounded with 35% by weight of dioctylphthalate as plasticizer and stabilized with 1% by weight of dibasic lead stearate and the composition then processed on a roller mill at a temperature of 175° C. into a thin sheet, the sheet material obtained is free of color. If the above polymerization reaction is carried out employing the equivalent amount of polyvinyl alcohol or partially esterified polyvinyl alcohol in place of the polyvinyl ammonium phosphate described above and the polymer obtained is then processed on a roller mill in the manner described above, the sheet material obtained is discolored and has a pronounced brownish cast.

We claim:

1. In a process for the polymerization of monomeric polymerizable ethylenically unsaturated organic compounds dispersed in an aqueous medium containing a polymerization catalyst to produce a polymer color-stable under heat in the presence of a lead heat-stabilizing agent, the step which comprises effecting said polymerization in said aqueous medium while said aqueous medium includes a small but effective amount of a color-stabilizing dispersing agent comprising a member of the group consisting of phosphorylated polyvinyl alcohol containing about two to three phosphoric acid groups per four vinyl groups.

2. Process in accordance with claim 1 in which the monomer is a mixture of monomeric, polymerizable, unsaturated organic compounds.

3. Process in accordance with claim 1 in which the monomeric compound is vinyl chloride.

4. Process in accordance with claim 1 wherein the dispersing agent is polyvinyl monoammonium phosphate.

5. Process in accordance with claim 4 wherein the monomeric compound is vinyl chloride.

6. In a process for the polymerization of vinyl chloride and vinyl monomers copolymerizable therewith dispersed in an aqueous medium containing a polymerization catalyst to produce a polymer color-stable under heat in the presence of a lead heat-stabilizing agent, the steps which comprise effecting said polymerization of the monomers dispersed in said aqueous medium while said aqueous medium includes a small but effective amount of color-stabilizing polyvinyl monoammonium phosphate.

7. In a process for the polymerization of vinyl chloride dispersed in an aqueous medium containing a peroxide polymerization catalyst to produce a polyvinyl chloride color-stable under heat in the presence of a lead heat-stabilizing agent, the steps which comprise effecting said polymerization of the vinyl chloride dispersed in said aqueous medium while said aqueous medium includes a small but effective amount of color-stabilizing polyvinyl monoammonium phosphate.

References Cited in the file of this patent

UNITED STATES PATENTS

| | | |
|---|---|---|
| 2,609,360 | Daul et al. | Sept. 2, 1952 |
| 2,692,876 | Cuprey | Oct. 26, 1954 |
| 2,868,765 | Haefner et al. | Jan. 13, 1959 |
| 2,979,491 | Piloni | Apr. 11, 1961 |

FOREIGN PATENTS

| | | |
|---|---|---|
| 524,615 | Italy | Apr. 28, 1955 |

OTHER REFERENCES

"Ind. and Eng. Chem.," vol. 46, No. 5, May 1954, pp. 1042–45.

"Rubber Age," Zimmerman and Weaver, vol. 68 (1930), page 314.